(12) United States Patent
Lum et al.

(10) Patent No.: US 6,732,549 B1
(45) Date of Patent: May 11, 2004

(54) MULTI-PASS SINTERING OF A SOL-GEL BODY THROUGH A HOT ZONE

(75) Inventors: Richard M Lum, Colts Neck, NJ (US); David A Mixon, Port Murray, NJ (US); Eric M Monberg, Princeton, NJ (US); Dennis J Trevor, Clinton, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 36 days.

(21) Appl. No.: 09/708,148

(22) Filed: Nov. 8, 2000

Related U.S. Application Data

(60) Provisional application No. 60/222,444, filed on Aug. 1, 2000.

(51) Int. Cl.[7] .............................................. C03B 37/027
(52) U.S. Cl. ............................. 65/384; 65/395; 65/427; 65/412
(58) Field of Search .......................... 65/395, 427, 384, 65/412

(56) References Cited

U.S. PATENT DOCUMENTS

| | | | |
|---|---|---|---|
| 4,217,027 A | 8/1980 | MacChesney et al. | 350/96.3 |
| 4,262,035 A | 4/1981 | Jaeger et al. | 427/39 |
| 4,707,174 A * | 11/1987 | Johnson et al. | 65/395 |
| 4,728,351 A | 3/1988 | Meerman | 65/18.1 |
| 4,789,389 A * | 12/1988 | Schermerhorn et al. | 65/390 |
| 4,840,653 A * | 6/1989 | Rabinovich | 65/395 |
| 4,857,092 A | 8/1989 | Meerman | 65/18.4 |
| 4,909,816 A | 3/1990 | MacChesney et al. | 65/3.12 |
| 5,240,488 A | 8/1993 | Chandross et al. | 65/3.11 |
| 5,254,508 A * | 10/1993 | Kirkbir et al. | 65/395 |
| 5,547,482 A * | 8/1996 | Chalk et al. | 65/17.2 |
| 5,948,535 A * | 9/1999 | Chiurlo et al. | 428/426 |

FOREIGN PATENT DOCUMENTS

| | | | |
|---|---|---|---|
| EP | 0181 040 A | 5/1986 | ......... C03B/37/012 |
| EP | 1 110 918 A | 6/2001 | ........... C03B/19/12 |
| GB | 2113200 * | 8/1982 | |
| JP | 57-22128 * | 2/1982 | |

OTHER PUBLICATIONS

Merriam Webster's Collegiate Dictionary, 10th edition, p. 1230.*
U.S. patent application Ser. No. 09/459,775, Monberg et al., filed Dec. 13, 1999.
Clasen R: "Preparation of high–purity glass silica tubes by centrifugal casting of colloidal gels" Journal of Materials Science Letters, vol. 7, No. 5, May 1988, pp. 477–478.
English Translation of Title and Abstract for EPC Patent Application Publication No. EP 0181 040A, May 14, 1986, publ'd at esp@cnet, one page.
Abstract of Japanese Publication 03 232728 A, "Production of Silica Glass", Applicant: Hitachi Chem. Co. Ltd. (Patent Abstracts of Japan, vol. 16 No. 6, Jan. 9, 1992) one page.
Abstract of Japanese Publication 63 397228 A, "Production of Quartz Glass", Applicant: Seko Epson Corp. (Patent Abstracts of Japan, vol. 13 No. 134, Apr. 4, 1989) one page.

* cited by examiner

*Primary Examiner*—John Hoffmann
(74) *Attorney, Agent, or Firm*—John F. McCabe

(57) ABSTRACT

A process produces a glass overcladding tube from a silica gel body. The process includes passing the gel body through a hot zone under conditions that cause partial sintering of the gel body and repassing the gel body through the hot zone under conditions that further sinter the gel body into a glass overcladding tube.

17 Claims, 3 Drawing Sheets

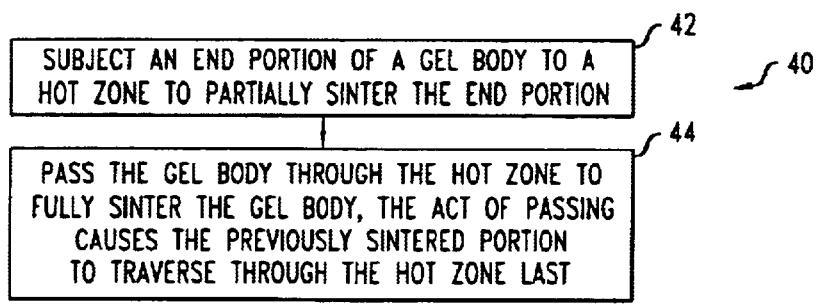
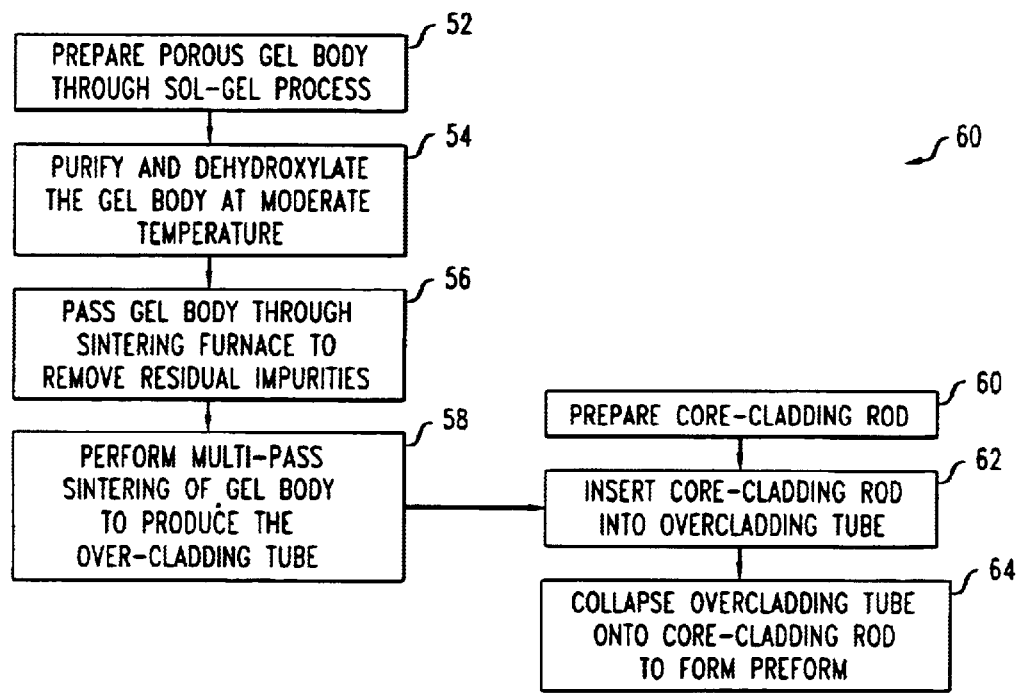

MULTI-PASS SINTERING OF A SOL-GEL BODY THROUGH A HOT ZONE

BACKGROUND OF THE INVENTION

This application claims the benefit of the U.S. Provisional Application No. 60/222,444; titled "Silica-Based Optical Fibers And Multi-Pass Sintering" by Richard M. Lum, David A. Mixon, Eric M. Monberg, and Dennis J. Trevor; and filed Aug. 1, 2000.

FIELD OF THE INVENTION

This invention relates to optical fibers and fabrication of preforms for use in drawing optical fibers.

DISCUSSION OF THE RELATED ART

Contemporary optical fibers are drawn from a cylindrical silica-glass object generally referred to as a preform. The preform has an axially symmetric structure that reflects the final structure of the optical fiber. The preform's structure usually includes a central core, a middle cladding layer, and an outer overcladding or jacketing layer. To achieve the desired optical properties of the fiber, the core has a higher index of refraction than the cladding layer. Differences in indexes of refraction of the various fiber layers come from dopants, e.g., germanium and/or fluorine, which are incorporated during production of the preform.

As preform size continues to increase, in order to reduce fiber costs, the amount of overcladding relative to cladding also increases. The overcladding may comprise more than 85 percent of the fiber's volume. The overcladding and its interface with the core-cladding largely determine mechanical properties such as draw breaking frequency and fiber limpness, i.e., curl. Though the overcladding determines mechanical properties, the core and cladding carry about 99 percent of the optical energy and primarily determine the fiber's optical properties. The diminished impact of the overcladding on optical properties suggests fabricating the overcladding with processes that produce high mechanical quality but lower optical quality. Since such processes are often less costly, using them to fabricate the voluminous overcladding can substantially reduce overall production costs for preforms and for final optical fibers.

A sol-gel process is described in U.S. Pat. No. 5,240,488, ("'488"), which is incorporated by reference herein in its entirety. By the sol-gel process, overcladding tubes can be fabricated more cheaply than by processes using deposited soot as starting material. Fabrication of an overcladding tube using the sol-gel process involves casting a porous and opaque gel body from a colloidal sol of silica particles. The gel body is then dried, purified and sintered to produce the final silica-glass overcladding tube. A pre-made rod structure for the core and cladding is inserted into the overcladding tube, which is collapsed to produce the final preform.

In the sol-gel process, the treatment of the dried gel body has at least two stages. In a first stage, a purification treatment removes impurities, e.g., organic matter, water, and transition metals. These impurities are either present in the fumed silica starting material or in additives used to produce the gel body or are contaminants introduced during processing. In a second stage, a heat treatment sinters the gel body to close pores between silica particles and produce the final glass overcladding tube from the porous gel body.

BRIEF SUMMARY OF THE INVENTION

A first embodiment features a process that produces a glass overcladding tube from a silica gel body. The process includes passing the gel body through a hot zone under conditions that cause partial sintering of the gel body and repassing the gel body through the hot zone under conditions that further sinter the gel body into a glass overcladding tube.

A second embodiment features another process for producing a glass overcladding tube from a silica gel body. The process includes subjecting one end of a cylindrical silica gel body to a hot zone until the end is at least partially sintered. The process also includes vertically passing the gel body through the hot zone to sinter the gel body. The act of passing causes the partially sintered end to enter the hot zone last.

Another embodiment features a manufacture for a preform. The preform has a core, a cladding layer, and an overcladding layer. The core, cladding layer, and overcladding layer each include silica-glass. The preform has an OD variation of 0.1 percent or less at one longitudinal position along the length of the perform.

BRIEF DESCRIPTION OF THE SEVERAL VIEWS OF THE DRAWING

FIG. 4 is a flow chart illustrating another embodiment of a process for sintering silica gel bodies; and FIG. 5 is a flow chart illustrating one embodiment of a process for fabricating preforms.

DETAILED DESCRIPTION OF THE INVENTION

Various embodiments sinter large gel bodies into silica-glass objects, such as, overcladding tubes, incrementally by processes that reduce stress levels on the gel body below stress levels encountered during conventional sintering processes. Recently, conventional processes were used to sinter large gel bodies to overcladding tubes for preforms from which about 600 kilometers of single-mode optical fiber can be drawn. For the large overcladding tubes, initial tubular silica gel bodies had lengths outer diameters (ODs), and inside diameters (IDs) of about 1600, 120, and 43 millimeters (mm), respectively.

The sintering of these large cross-sectional area (CSA) gel bodies was accompanied by several problems. First, the last-to-sinter ends of the large gel bodies tended to fracture with conventional sintering procedures. Second, overcladding tubes made from the large gel bodies had less uniform inside diameters (IDs) and CSAs, which degrades the ability to physically match such overcladding tubes to core-cladding rods thereby increasing dispersion variations among the final fibers produced from such tubes. Dispersion is a critical performance fiber parameter for many applications. Third, the overcladding tubes made from the large gel bodies had high variations in [OH] levels, e.g., from about 5 to 30 parts per million (ppm). High [OH] levels are undesirable for overcladding tubes used to make optical fibers that will transmit light with any wavelength between about 1.55 and 1.31 microns, i.e., a range containing a strong [OH] optical absorption peak.

Figure 1:
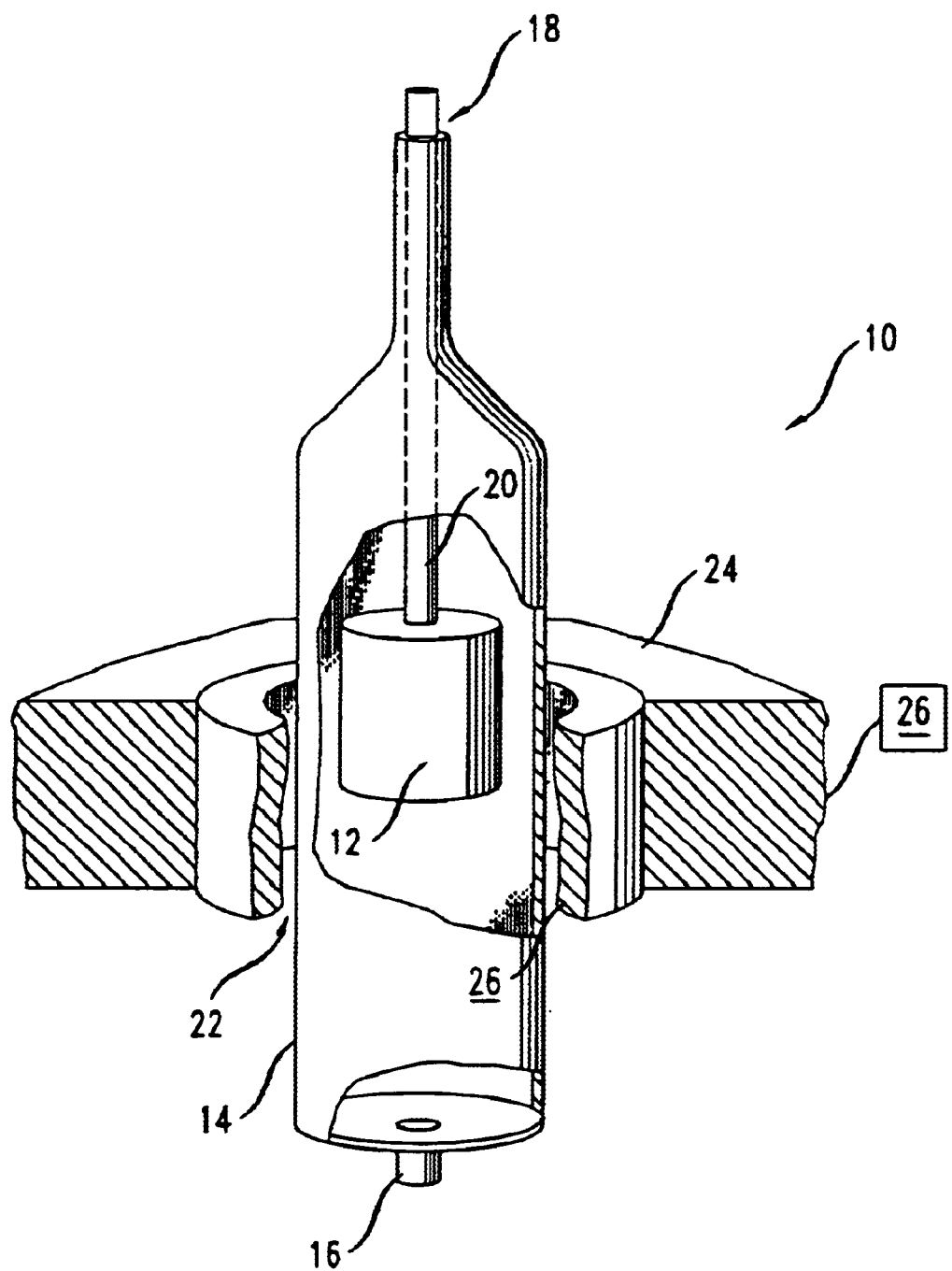
FIG. 1 is a cross-sectional view of one embodiment of a sintering apparatus.

FIG. 1 shows a sintering apparatus 10 for producing a silica-glass overcladding tube from a tubular silica gel body 12. Silica gel bodies are porous and opaque to visible light. The silica gel body 12 is made by one of the sol-gel processes described in the '488 patent. The gel body 12 may contain residual impurities such as organic materials adsorbed onto the gel body 12 subsequent to purification and purification byproducts that may remain in the body's pores due to their low volatility.

In some embodiments, the silica gel body 12 may have another shape and may be prepared by other processes. For example, the gel body 12 may have a shape adapted for producing lenses, prisms, or silica flanges or fixtures of diverse shapes. Such gel bodies can be produced from aerogels, alkoxide-based gels, or xerogels known to those of skill in the art.

During sintering, the gel body 12 is enclosed in a controlled-atmosphere muffle 14, e.g., a fused quartz firing shroud with an end plate or a furnace liner. The muffle 14 has a port 16 for introducing gases into and a second port for exhausting gases from the region adjacent the gel body 12. One opening 18 into the muffle 14 allows attaching a mechanical device 20 that supports the weight of the gel body 12 during sintering. For example, the device 20 may be the top support described in co-pending U.S. patent application Ser. No. 09/459,775, filed Dec. 13, 1999, which is incorporated herein by reference.

The sintering apparatus 10 can vertically raise or lower the gel body 12 through a hot zone 22 of a furnace 24 at an adjustable speed so that the gel body 12 passes through the hot zone 22. The length of the muffle 14 accommodates raising and lowering the gel body 2 completely through the hot zone 22.

The temperature of the hot zone 22 can be gradually and controllably varied between about 0–1,600° C. by a control apparatus 26. During sintering, portions of the gel body 12 are heated to temperatures between about 1350 and 1600° C. This initiates viscous sintering causing the gel body 12 to shrink and finally transform into a transparent silica overcladding tube. For a given furnace configuration, the gel body's CSA and the traversal rate through the hot zone 22 will determine axial and radial temperature gradients within the gel body 12. During sintering, temperature gradients may produce large stresses in the gel body 12. The stresses induced in the gel body can increase the chances of cracking during the sintering or subsequent processing. Performing the sintering incrementally can lower such stresses.

Figure 2:
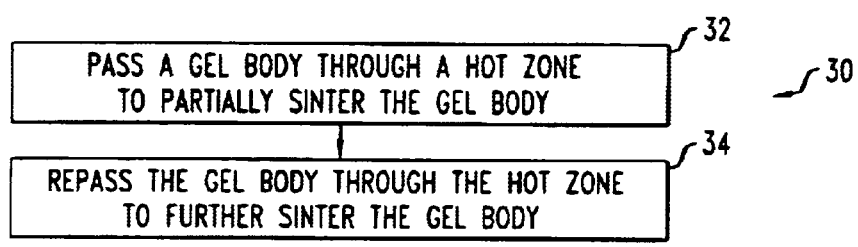
FIG. 2 is a flow chart illustrating one embodiment of a multi-pass process for sintering silica gel bodies.

FIG. 2 is a flow chart showing a process 30 for multi-pass sintering of silica gel bodies, e.g., using sintering apparatus 10 of FIG. 1. Initially, the process 30 causes the gel body to pass along the hot zone partially sintering the gel body (step 32). Passing the body along hot zone may entail raising the gel body vertically up through the hot zone in a direction opposite to gravity or lowering the gel body vertically down through the hot zone in the direction of gravity. Alternatively, passing the gel body along the hot zone may entail moving the hot zone instead of the gel body so that the hot zone passes over the gel body. During the sintering, the furnace's hot zone is kept at a high enough temperature to cause closure of pores between silica particles and shrinkage of the gel body, e.g., 1300–1550° C. Partial sintering occurs if shrinkage reduces linear dimensions of the gel body, e.g., the diameter and length, by 1% or more and may cause shrinkage of these dimensions by 5% or more. The extent of shrinkage depends on the time in the hot zone, temperature of the hot zone, pore size in the gel, and the viscosity of the silica. After the first partial sintering pass, the process 30 causes the gel body to pass through the hot zone producing further sintering of the gel body (step 34). The further sintering incrementally shrinks linear dimensions of the gel body by one percent or more. By incrementally sintering the gel body through two or more steps, the process 30 decreases mechanical stresses with respect to conventional processes that entirely sinter the gel body in one pass. Performing sintering incrementally in several passes lowers risks that the gel body will crack during sintering.

In the process 30, each incremental sintering pass shrinks linear dimensions of the gel body by a fraction of the total shrinkage needed to fully sinter the gel body. About a 24 percent total shrinkage is generally needed to produce the transparent overcladding tube from a gel body prepared via a sol-gel process such as described in '488. The sintering-induced volume shrinkage of process 30 is more gradual than single pass processes and produces lower cracking stresses in the gel body. One embodiment of the process 30 performs three sintering passes through the hot zone to shrink the gel body's diameter by a total of about 8, 16, and 24 percent after the first, second, and third sintering passes, respectively (see FIG. 3). In this embodiment, the successive sintering passes are performed at successively higher furnace temperatures between about 1300 and 1580° C. The temperature is not however, raised after each sintering pass in all embodiments.

Each pass may vertically pull the gel body 12 up through the hot zone 22 opposite to the direction of gravity so that the top of the gel body 12 is sintered first Sintering the top first reduces the probability of a catastrophic crack Cracks usually form at the last sintered end of the gel body 12, because the last-to-sinter end is subject to the higher sintering stresses. If the gel body 12 is pulled up through the hot zone 22, a crack is more probable to form near the bottom of the gel body 12, because the bottom is the last portion to sinter. Then, only the bottom of the gel body is likely to crack and break off if the sintering-induced expansion stresses become too large.

Each pass may alternatively lower the gel body 12 vertically down, in the direction of gravity, through the hot zone 22. In this case, a crack is more probable to form near the top of the gel body 12, because the top becomes the last portion to sinter. Then, cracks are more likely to form near the top of the gel body 12. Such a crack could be catastrophic and cause the whole gel body to break off top supporting mechanical device 20 completely destroying the gel body and possibly damaging the furnace 24.

One embodiment sinters a silica gel body having an initial length of about 1600 mm or more, an OD of about 120 mm or more, an ID of about 43 mm or less, and a weight of about 14 kilograms or more in three sintering steps. The three steps produce a total reduction of the OD and length by about 24 percent. During each sintering step, the atmosphere surrounding the gel body 12 is an oxygen and helium mixture. For the sintering steps, which cause pore closure, the molar ratio of oxygen to helium is less than or equal to about 0.025. For these steps, a higher oxygen percentage can cause bubble formation due to the low diffusivity of trapped oxygen. Bubbles in the glass can cause air lines in the fiber drawn from a preform using the overcladding tube or frothing of the overcladding tube itself. The low partial pressure of oxygen aids to remove organic impurities and to oxidize the Si—Cl moiety created during a previous dehydroxylation step. The oxygen combines with the Si—Cl moiety to form siloxane bonds, i.e., Si—O—Si, and release chlorine gas.

In the exemplary embodiment, the temperature is about 1380° C. during the first sintering pass, and the gel body is vertically pulled up through the hot zone 22, against gravity, at a rate of about 30 mm per minute. The pass produces substantial shrinkage of the gel body 12. After the entirely passing through the hot zone 22, the gel body 12 is rapidly lowered back through the furnace 22, e.g., at a rate of 500 mm or more per minute, to reposition the gel body 12 for the next pass. The lowering rate is fast enough to not produce substantial sintering or shrinkage.

For the next sintering pass, the temperature is ramped up to a higher temperature of about 1440° C., and the gel body is vertically pulled up through the hot zone 22, against the pull of gravity, at the rate of about 30 mm per minute. The higher temperature decreases the processing time needed to produce further sintering. During the second pass, chlorine gas, water and volatile compounds continue to discharge from the gel body 12 as impurities are further removed. After entirely passing through the hot zone 22, the gel body 12 is rapidly lowered back through the furnace 22 to reposition the gel body 12 for the next pass.

For the third sintering pass, the temperature of the furnace 24 is raised farther to about 1500° C., and the gel body is pulled up through the hot zone 22, against gravity, at a slower rate of about 10 mm per minute. This last pass produces further shrinkage and completes sintering to produce the transparent overcladding tube. After the last pass, the gas mixture is changed to pure helium, and the silica-glass tube is cooled down to 25° C. over a period of about an hour.

Figure 3:
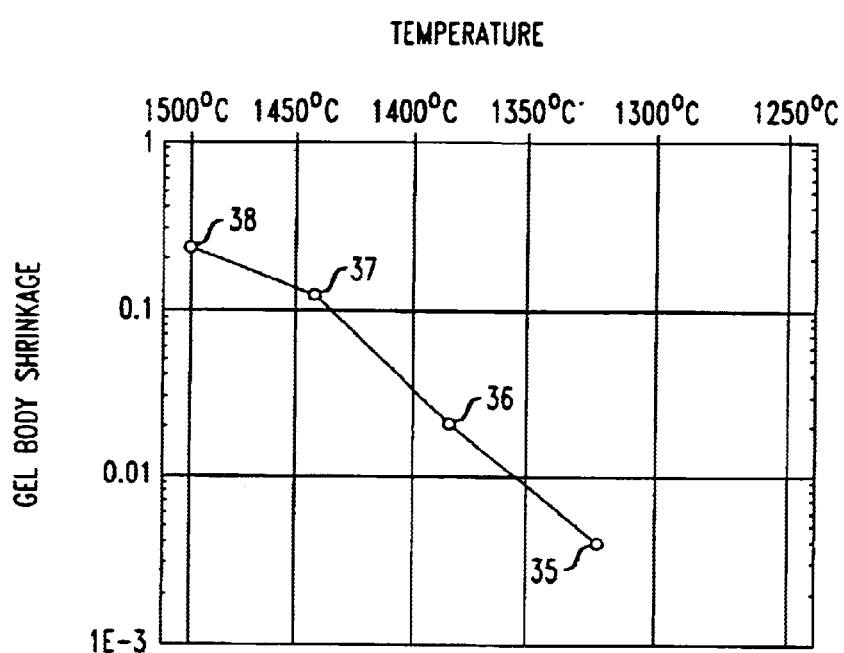
FIG. 3 is a graph showing shrinkages of an exemplary gel body during multiple-pass sintering.

FIG. 3 indicates data points 35–38 for shrinkages of the OD of one tubular gel body during individual passes of the gel body through a hot zone of a sintering furnace. The first three passes lifted the gel body through the sintering furnace at rates of about 30 mm per minute. The final pass lifted the gel body through the sintering furnace at a rate of about 10 mm per minute. The data point 37 below 1350° C. corresponds to a purification pass of the gel body through the hot zone in which sintering does not occur, i.e., less than one percent shrinkage of the body's diameter and length. The last data point 38 corresponds to the final transparent overcladding tube for which the diameter of the initial gel body has undergone a total shrinkage of about 24 percent.

FIG. 4 is a flow chart showing an alternate process 40 for multi-pass sintering of silica gel bodies, e.g., using apparatus 10 of FIG. 1. Initially, the process 40 performs an end dip by subjecting an end portion of the gel body to the furnace's hot zone to partially or fully sinter that end portion (step 42). For example, the process 40 may lower 20–100 mm of the gel body into a 1500–1540° C. hot zone at a rate of 5–50 mm per minute during the end dip. The resulting heat treatment causes shrinkage of the end of the gel body that is indicative of sintering, i.e., shrinkage of the diameter by 1% or more. After partially or fully sintering the end portion, the tube is rapidly lowered vertically through the hot zone until the top of the gel body is at the center of the hot zone. Then, process 40 pulls the entire gel body, opposite to the direction of gravity, vertically up so that the gel body passes through the furnace's hot zone in a manner that sinters the entire gel body and sends the partially sintered end portion through the hot zone last (step 44). This complete sintering pass of the gel body through the hot zone shrinks the diameter of the gel body by about 23–27 percent. During this sintering pass, lower stresses are exerted on the end portion of the gel body due to the previous sintering of that portion. The lower stresses at the last-to-sinter end reduce risks of crack formation during the complete sintering pass, because cracks tend to propagate out from the last-to-sinter end of the gel body.

The multi-pass process 30 and the end-dip process 40 use similar amounts of time to sinter a silica gel body.

FIG. 5 is a flow chart for a process 50 that fabricates preforms for drawing single-mode or multi-mode optical fibers. The process 50 includes preparation of a porous silica gel body (step 52). The gel body may be formed by the sol-gel process, which molds a silica gel body from a sol of silica particles and then dries the gel body to remove 95–98% of the water initially present therein as described in the '488 patent. The gel body may also be formed from an aerogel, an alkoxide-based gel, or an xerogel, which has been dried, for example, through a microwave process.

After drying, the gel body may still have contaminants, e.g., quaternary ammonium salts, organic polymers, metal oxides and transition metals. To remove these contaminants, the process 50 performs a purification and dehydroxylation treatment of the gel body in a moderate-temperature furnace, i.e., below 1000° C. (step 54).

The purification and dehydroxylation treatment includes several stages. The first exemplary stage heats the dried gel bodies to about 350° C. in a bath of nitrogen gas to decompose quaternary ammonium salts releasing gaseous byproducts. The next stage changes the atmosphere to air so that oxygen therein reacts with and decomposes the organic impurities releasing gaseous byproducts. The next stage changes the atmosphere to thionyl chloride, which reacts with the refractory metal oxides releasing gaseous byproducts. The last stage changes the atmosphere to chlorine and raises the temperature to about 950° C. The chlorine dehydroxylates the gel body by reacting with silica hydroxides to produce silicon-bound chlorine and gaseous byproducts. The gaseous byproducts are removed.

After the purification and dehydroxylation treatment, the gel bodies may still have residual impurities including chemically bound chlorine (bound during dehydroxylation), metal chlorides, and organic materials adsorbed during any storage period. To remove these residual impurities, the process 50 passes the gel body through a sintering furnace's hot zone, e.g., the hot zone 22 of FIG. 1 (step 56). This purification pass does not significantly close pores between silica particles, because the hot zone is kept below about 1300° C. or at least below about 1350° C. Shrinkage of the diameter or length of the gel body by less than about 1 percent is indicative of insignificant pore closure and characteristic of the purification pass through the hot zone.

The purification pass through the hot zone is performed in an atmosphere of oxygen and helium in which the molar ratio of oxygen to helium may be between 0.5 and 0.025. High molar fractions of oxygen are allowed, because the purification pass does not result in the closing of pores and the subsequent trapping of oxygen. The oxygen reacts with the bound chlorine to produce silica glass and chlorine gas. The chlorine is flushed out of the muffle surrounding the gel body. The oxygen aloxidizes adsorbed organic impurities to produce other gaseous byproducts that are flushed out.

For the above-described 1600 mm long silica gel body, one embodiment pulls the gel tube vertically up through a hot zone heated to about 1320° C. at a pull rate of about 30 mm per minute to perform the purification pass. After passing through the hot zone 22, the gel body 12 is rapidly lowered back through the furnace 22, e.g., at 150 mm per minute, to reposition the gel body 12 for the sintering passes. Some embodiments use the same oxygen partial pressure in the purification and sintering passes.

After the purification pass, the process 50 sinters the gel body by a multi-pass process, e.g., process 30 or 40 of FIGS.

2 and 4, respectively (step 58). Sintering passes of the gel body through the hot zone close pores of the gel tube to produce a final transparent overcladding tube.

The process 50 also prepares a silica-glass core-cladding rod of high optical quality (step 60). The preparation of the core-cladding rod may proceed by vapor axial deposition (VAD), outside vapor deposition (OVD), or modified chemical vapor deposition (MCVD) as described in U.S. Pat. Nos. 4,217,027; 4,262,035; and 4,909,816, which are incorporated by reference herein.

After preparation of the core-cladding rod and overcladding tube, the process 50 inserts the core-cladding rod into the overcladding tube (step 62). The process 50 heat collapses the overcladding tube onto the core-cladding rod, e.g., by heating sections with a torch to 2000° C. or more, to produce the final preform (step 64). After cooling, the preform is ready for use in optical fiber drawing.

From a gel body with initial length, OD, and ID of about 1600, 120, and 43 mm and produced by the sol-gel process, the process 50 produces an overcladding tube with final length, OD, and ID of about 1200, 90, and 35 mm, respectively. Thus, the overcladding tubes produced by the process 30 or 40 are useable to construct cylindrical preforms with lengths and ODs greater than 1000 mm and 75 mm, respectively. Some such preforms have length and OD greater than about 1200 mm and about 90 mm, respectively.

The sintering process 30 produces overcladding tubes with small ID and CSA variations. For 1000 mm long overcladding tubes, tolerances for ID variations along the tube can be kept below 1 percent or between 0.5 and 5 percent. CSA variations along the tube can be kept below about 1 percent if each sintering pass starts at the bottom end of the cast gel body and below about 0.5–1.0 percent if successive sintering passes start at the top end of the cast gel body. In either case, CSA variations are between about 0.4 to 2.0 percent. Uniformity of ID and CSA reduces dispersion variations along the length of the final optical fiber.

The sintering process 30 produces overcladding tubes with low ovalities. Herein, the ovality is defined to be the maximum OD minus the minimum OD at one longitudinal position along the overcladding tube. Ovalities can be equal to or smaller than 100 microns, 50 microns, or 30 microns when 90 mm OD overcladding tubes are produced according the sintering process 30. These ovalities produce a variation in OD equal to about $10^{-1}$, $5 \times 10^{-2}$, or $3 \times 10^{-2}$ percent or less at any longitudinal position along the final preform.

Variations in a preform's OD result in variations in the core-cladding geometry of the final fiber. The variations in core-cladding geometry occur, because fiber drawing is controlled by the OD of the preform. Preforms with lower ovalities produce fibers with a more uniform core-cladding ODs. This better control of the corecladding OD is increasingly important as the ratio of deposited cladding to core material decreases.

Preforms produced by processes 50 and 30 have very low levels of [OH]. For example, levels of [OH] impurities can be below about 2 ppm and even below 0.2 ppm in overcladding tubes produced by the process 30. Optical fibers made with these overcladding tubes can have light absorption levels of about 0.4 decibels/kilometer (dB/km) at 1.385 microns and levels of about 0.2 dB/km at 1.55 microns. These low absorption levels enable using such fibers for optical transmission applications over the whole wavelength range between about 1.31 and 1.55 microns.

Other embodiments of the invention will be apparent to those skilled in the art from consideration of the specification and practice of the invention disclosed herein.

What is claimed is:

1. A process, comprising:

passing a silica gel body through a hot zone under conditions that cause partial sintering of the gel body such that pore closure in the gel body and shrinkage of a linear dimension of the gel body by at least one percent are produced; and then, repassing the gel body through the hot zone under conditions that further sinter the gel body such that further pore closure in the gel body and further shrinkage of a linear dimension of the gel body by at least one percent are produced.

2. The process of claim 1, wherein each of the passing and the repassing comprises:

vertically moving the gel body through the hot zone in a direction of gravity or in a direction opposite to gravity.

3. The process of claim 1, further comprising:

passing the gel body through the hot zone under conditions that significantly purify the gel body without shrinking the gel body.

4. The process of claim 3, further comprising:

treating the silica gel body to cause dehydroxylation prior to performing the passing a silica gel body through a hot zone under conditions that cause partial sintering of the gel body.

5. The process of claim 1, wherein the gel body has a tubular shape;

the passing causes at least a 1 percent shrinkage in a diameter of the gel body; and the repassing causes at least another 1 percent shrinkage in the diameter of the gel body.

6. The process of claim 5, wherein one of the passing and the repassing causes at least a 5 percent shrinkage of the diameter of the gel body.

7. The process of claim 1, further comprising:

forming a sol comprising silica particles; and casting the gel body from the sol.

8. The process of claim 1, wherein both the passing and repassing include vertically moving the hot zone along the gel body in a direction, the direction being along or opposite to a direction of gravity.

9. The process of claim 8, wherein the passing and repassing include regulating a temperature of the hot zone to be at least 1300° C.

10. The process of claim 9, wherein the passing and repassing produce a preform having a level of [OH] impurities of less than 2 parts per million.

11. The process of claim 8, further comprising:

inserting a core-cladding rod into the further sintered gel body; and heat collapsing the further sintered gel body onto the rod to produce a preform.

12. The process of claim 1, wherein the repassing includes producing a transparent silica-glass overcladding tube.

13. A process, comprising:

subjecting one end of a cylindrical silica gel body to a hot zone until the end is at least partially sintered in a manner that produces both pore closure in the end and shrinkage of a linear dimension of the end by at least 1%; and then, vertically passing the whole gel body through the hot zone to sinter in a manner that produces pore closure in the gel body and shrinkage of a linear-dimension in the gel body, the vertically passing causing the end to enter the hot zone last.

14. The process of claim 13, wherein the subjecting causes the end to have a diameter at least 1 percent smaller than the diameter of the end prior to the subjecting.

15. The process of claim 14, wherein the vertically passing includes raising the gel body through the hot zone in a direction opposite to the direction of gravity.

16. The process of claim 13, further comprising:
producing the silica gel body from a sol comprising silica particles; and
wherein the gel body has a tubular form.

17. The process of claim 13, wherein the passing produces a silica glass tube.

* * * * *